(12) United States Patent
Carmeli

(10) Patent No.: US 8,040,242 B2
(45) Date of Patent: *Oct. 18, 2011

(54) HIERARCHICAL RFID

(75) Inventor: Boaz Carmeli, Koranit (IL)

(73) Assignee: International Business Machines Corporation, Armonk, NY (US)

(*) Notice: Subject to any disclaimer, the term of this patent is extended or adjusted under 35 U.S.C. 154(b) by 405 days.

This patent is subject to a terminal disclaimer.

(21) Appl. No.: 11/672,045

(22) Filed: Feb. 7, 2007

(65) Prior Publication Data

US 2008/0186147 A1 Aug. 7, 2008

(51) Int. Cl.
*G08B 13/14* (2006.01)
*H04Q 5/22* (2006.01)
(52) U.S. Cl. ............ 340/572.1; 340/10.51; 340/10.52
(58) Field of Classification Search ............ 340/10.51, 340/572.1, 10.52
See application file for complete search history.

(56) References Cited

U.S. PATENT DOCUMENTS

| | | |
|---|---|---|
| 2005/0253687 A1 | 11/2005 | Martinez et al. |
| 2006/0006987 A1* | 1/2006 | Hashimoto et al. ......... 340/10.51 |
| 2006/0012473 A1 | 1/2006 | Bishop et al. |
| 2006/0017545 A1 | 1/2006 | Volpi et al. |
| 2006/0087407 A1 | 4/2006 | Stewart et al. |
| 2006/0181420 A1* | 8/2006 | Ishii ........................... 340/572.1 |
| 2006/0212164 A1* | 9/2006 | Abraham et al. ............ 700/215 |

FOREIGN PATENT DOCUMENTS

JP 2006146361 A1 8/2006

* cited by examiner

*Primary Examiner* — Bren Swarthout
*Assistant Examiner* — Andrew Bee
(74) *Attorney, Agent, or Firm* — Dan Swirsky

(57) ABSTRACT

An RFID tag is provided including an object ID and a counter. Such an RFID tag may be employed in an RFID tag system including a parent RFID tag having an object ID and a counter, a child RFID tag, and a reader/writer configured to read the object ID and the counter of the parent RFID tag, combine values of the object ID and the counter, and write the combined value to an object ID of the child RFID tag.

9 Claims, 4 Drawing Sheets

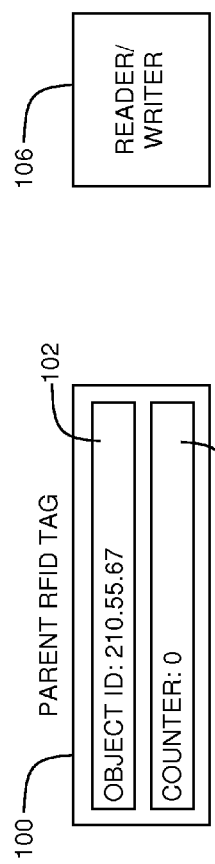
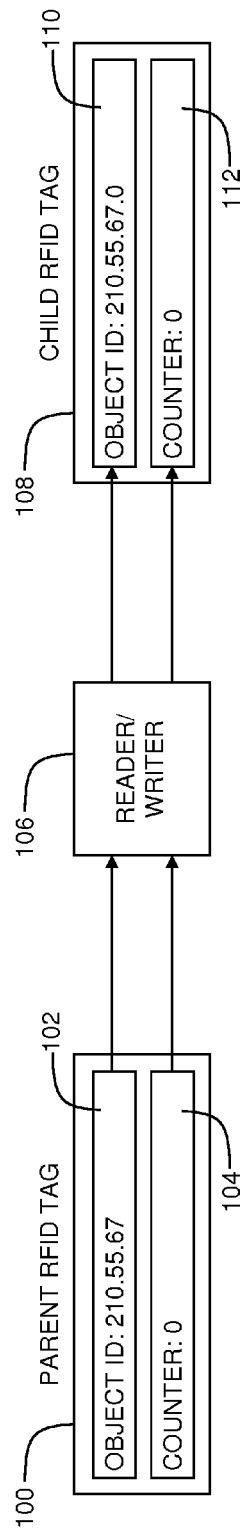
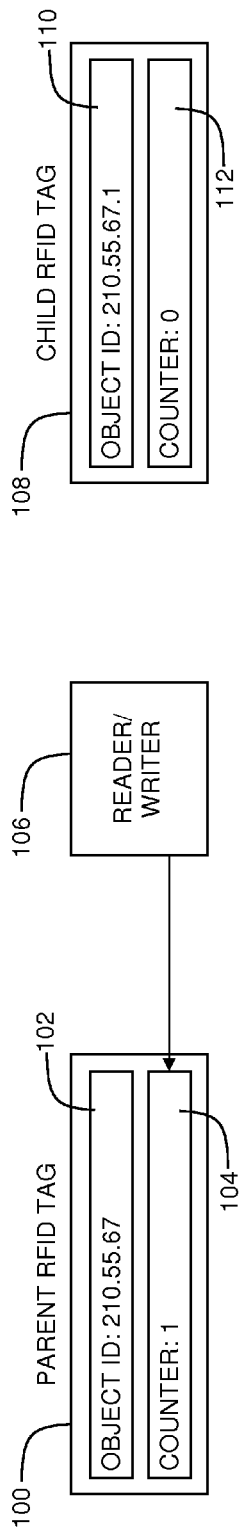

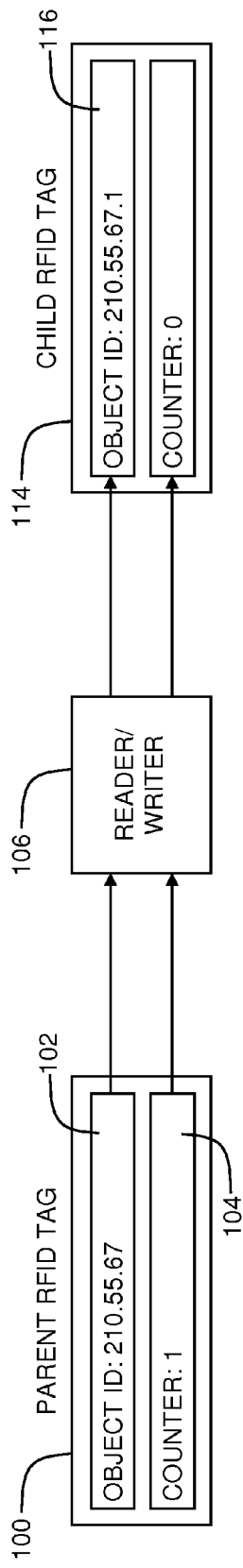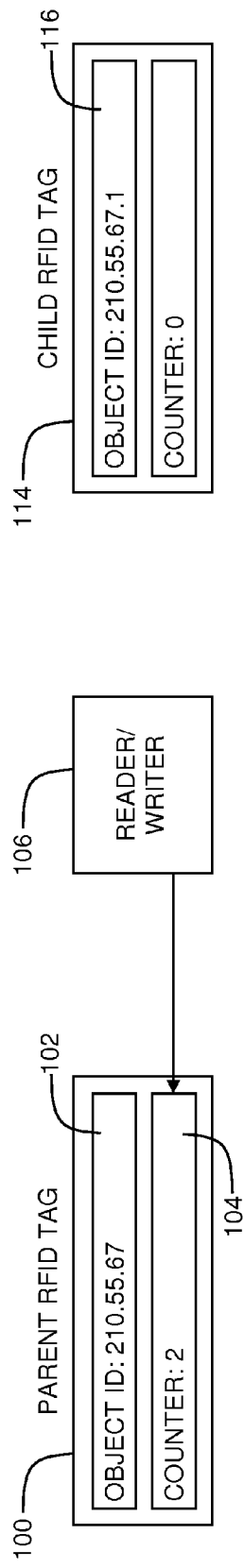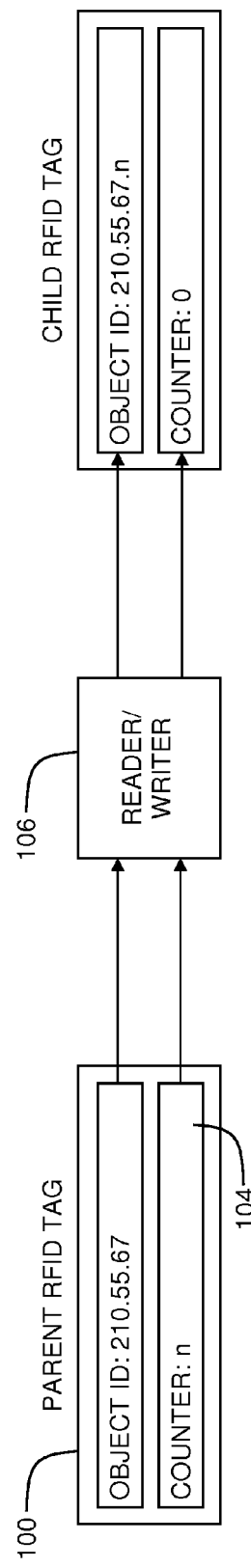

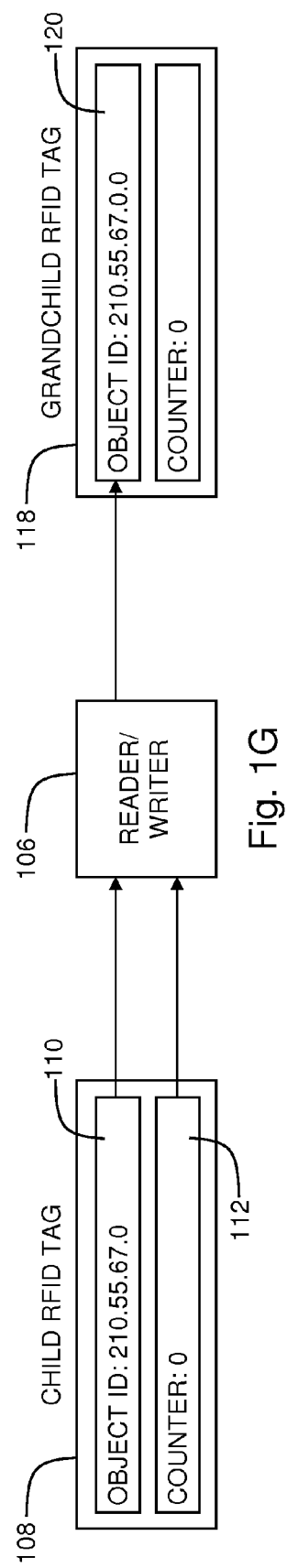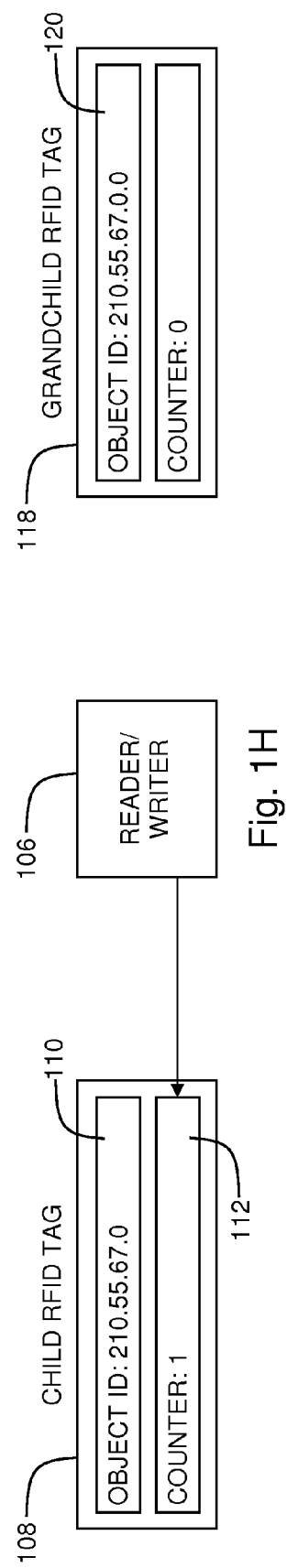

HIERARCHICAL RFID

FIELD OF THE INVENTION

The present invention relates to RFID tagging in general, and in particular to RFID tag identification management.

BACKGROUND OF THE INVENTION

Radio Frequency Identification (RFID) tags are typically attached to objects for information and/or tracking purposes, where information may be written to an RFID tag and later read by an external reader. Information stored on an RFID tag may include an object identifier (ID) that distinguishes the object from other objects. For example, a medical laboratory may attach RFID tags to vials containing patient blood samples, where each RFID tag includes a unique object ID identifying the vial to which it is attached, which object ID may then be recorded and mapped to the patient from whom the sample was taken.

While RFID tags may be used to provide information about individual objects, it may be desirable to associate objects with other objects. For example, where a patient blood sample in one "parent" vial is divided into several other "child" vials, each destined for a different type of analysis, the object ID of each child vial's RFID tag may be recorded in a database together with the object ID of the parent vial's RFID tag. However, where the contents of child vials are further distributed to several other "grandchild" vials, or when vials are sent outside of an organization, managing the hierarchy of object relationships using object IDs of otherwise unrelated RFID tags may become cumbersome.

SUMMARY OF EMBODIMENTS OF THE INVENTION

The present invention in embodiments thereof discloses RFID tag architecture and methods for managing RFID tag object IDs that are particularly useful for expressing parent-child object relationships among RFID tags.

There is thus provided in accordance with the present invention an RFID tag including an object ID, and a counter.

In another aspect of the present invention an RFID tag system is provided including a parent RFID tag having an object ID and a counter, a child RFID tag, and a reader/writer configured to read the object ID and the counter of the parent RFID tag, combine values of the object ID and the counter, and write the combined value to an object ID of the child RFID tag.

In another aspect of the present invention the reader/writer is configured to read a value of the counter, change the read value, and write the changed value back to the counter.

In another aspect of the present invention the reader/writer is configured to change the counter value subsequent to writing the combined value to the object ID of the child RFID tag.

In another aspect of the present invention the reader/writer is configured to initialize a value of a counter of the child RFID tag.

In another aspect of the present invention a method is provided for managing RFID tags, the method including configuring an RFID tag with an object ID, and configuring the RFID tag with a counter.

In another aspect of the present invention a method is provided for managing RFID tags, the method including reading values of an object ID and a counter of a parent RFID tag, combining the values, and writing the combined value to an object ID of a child RFID tag.

In another aspect of the present invention the method further includes changing the read value of the counter, and writing the changed value back to the counter.

In another aspect of the present invention the changing step includes changing the read counter value subsequent to writing the combined value to the object ID of the child RFID tag.

In another aspect of the present invention the method further includes initializing a value of a counter of the child RFID tag.

In another aspect of the present invention the method further includes reading values of the object ID and a counter of the child RFID tag, combining the values, and writing the combined value to an object ID of a grandchild RFID tag.

BRIEF DESCRIPTION OF THE DRAWINGS

Embodiments of the present invention will be understood and appreciated more fully from the following detailed description taken in conjunction with the appended drawings in which:

FIGS. 1A-1H are simplified conceptual illustrations of a hierarchical RFID system, constructed and operative in accordance with an embodiment of the present invention.

DETAILED DESCRIPTION OF EMBODIMENTS OF THE INVENTION

Figure 2:
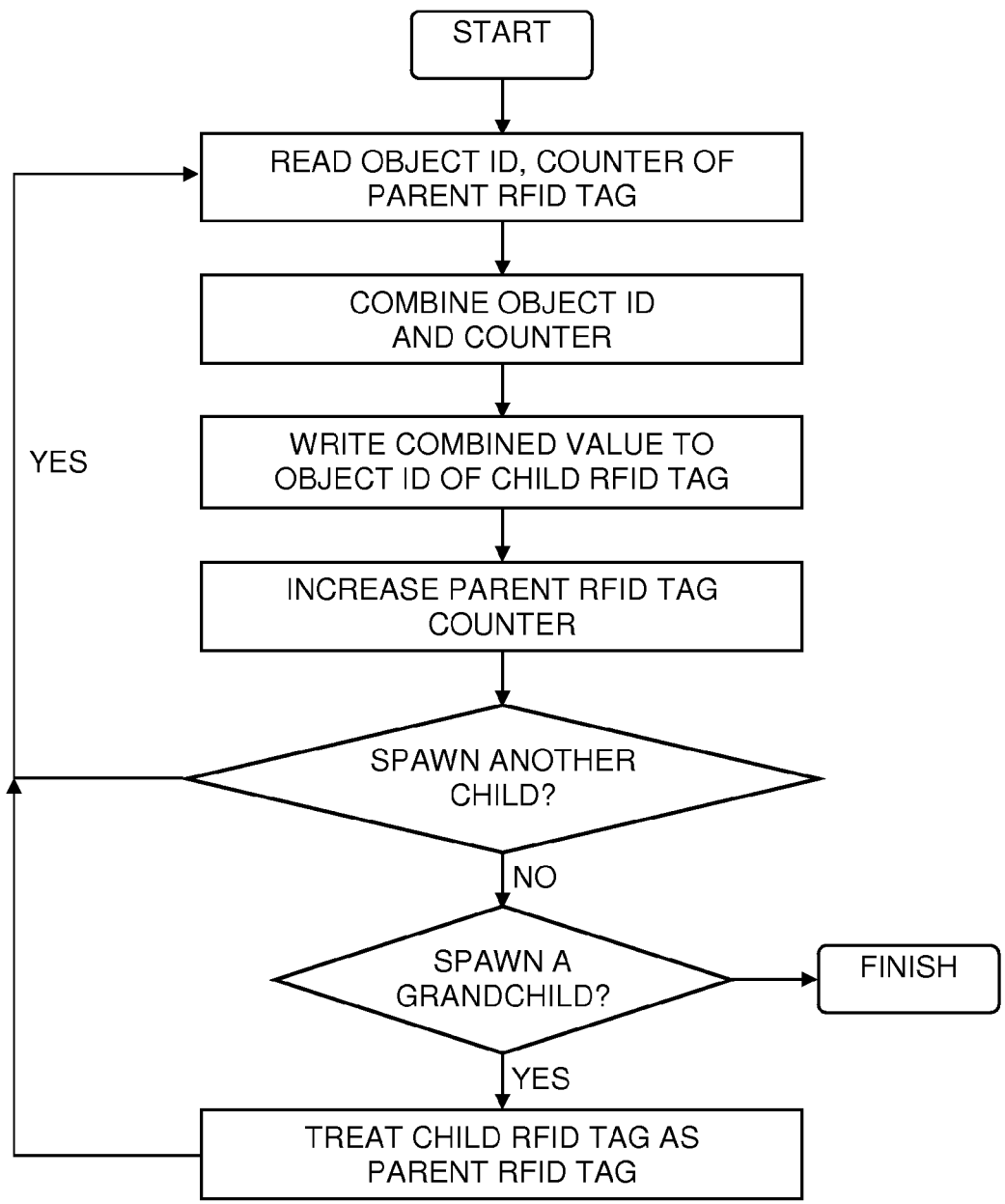
FIG. 2 is a simplified flowchart illustration of an exemplary method of operation of the hierarchical RFID system of FIGS. 1A-1H, operative in accordance with an embodiment of the present invention.

The present invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

Reference is now made to FIGS. 1A-1H, which are simplified conceptual illustrations of a hierarchical RFID system, constructed and operative in accordance with an embodiment of the present invention, and additionally to FIG. 2, which is a simplified flowchart illustration of an exemplary method of operation of the hierarchical RFID system of FIGS. 1A, 1B, and 1C, operative in accordance with an embodiment of the present invention. In FIG. 1A an RFID tag 100 is configured with an object ID 102 and a counter 104, both of which may be initialized to initial values, such as a unique ID for object ID 102 and 0 for counter 104. A reader/writer 106 is shown that is capable of reading RFID tag 100 in accordance with conventional techniques. In addition to reading RFID tag 100 to obtain object ID 102, reader/writer 106 is also able to read counter 104.

In accordance with the present invention, RFID tag 100 may be used as a "parent" RFID tag by reader/writer 106 to spawn a "child" RFID tag 108, as is shown in FIG. 1B, by combining the values of object ID 102 and counter 104 of parent RFID tag 100, such as by appending a separator and the value of counter 104 to the end of the value of object ID, and then writing the combined result to an object ID 110 of child RFID tag 108. Thus, in the example shown, a period separator and the counter value 0 of counter 104 are appended by reader/writer 106 to the object ID value 210.55.67 of object ID 102, resulting in the value 210.55.67.0, which reader/writer 106 writes to object ID 110 of child RFID tag 108.

After parent RFID tag 100 is used to spawn child RFID tag 108, its counter is preferably changed by reader/writer 106, such as by adding 1 to the current value of counter 104 and writing the new value to counter 104. Thus, counter 104 changes from a value of 0 to a value of 1 as is shown in FIG. 1C. In this way parent RFID tag 100 may be used to spawn additional child RFID tags, each having a unique object ID. Thus, in FIG. 1D reader/writer 106 uses parent RFID tag 100 to spawn another child RFID tag 114, whose object ID 116 is initialized with the value 210.55.67.1, thus distinguishing it from the object ID of child RFID tag 108. Reader/writer 106 then increments counter 104 of parent RFID tag 100 as is shown in FIG. 1E. Parent RFID tag 100 may be used by reader/writer 106 to spawn additional child RFID tags, such as to a maximum of n child RFID tags as shown in FIG. 1F, where n may be set to a predefined value or may represent a maximum value of an RFID tag counter as limited by the number of digits the counter may hold.

Referring again to FIG. 1B and additionally to FIG. 1G, child RFID tag 108 may be configured with a counter 112 that reader/writer 106 may initialize to an initial value, such as 0, when object ID 110 is first populated. Thus, child RFID tag 108 may itself become a parent RFID tag and spawn child RFID tags that are "grandchildren" of RFID tag 100. In this manner, further generations of child RFID tags may be spawned, with each child generation becoming a parent generation for its children, and so on. Thus, for example, in FIG. 1G child RFID tag 108 is used by reader/writer 106 to spawn a grandchild RFID tag 118, where a period separator and the counter value 0 of counter 112 are appended by reader/writer 106 to the object ID value 210.55.67.0 of object ID 110, resulting in the value 210.55.67.0.0, which reader/writer 106 writes to an object ID 120 of grandchild RFID tag 118. Reader/writer 106 then increments counter 112 of child RFID tag 108 as is shown in FIG. 1H.

It will be appreciated that the present invention is useful where it is desirable to associate objects with other objects. Thus, in the example above, where a patient blood sample in one parent vial is divided into several other child vials, each destined for a different type of analysis, the relationships among the vials may be expressed by their RFID tags by tagging the parent and child vials with the RFID tags of the present invention, where the object ID and counter of the parent vial's RFID tag is combined to form the object ID of each child vial's RFID tag.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware or software using conventional techniques.

What is claimed is:

1. An RFID tag system for creating one or more child RFID tag object IDs from a parent RFID tag, comprising:
    said parent RFID tag having an object ID, and a counter for generating a value corresponding to the number sequence of said one or more child RFID tag object IDs to be created; and
    a reader/writer configured to
    read said object ID and said counter of said parent RFID tag,
    combine values of said object ID and said counter of said parent RIFD tag by appending the value of said counter to an end of the value of said object ID of said parent RFID tag into a combined value, and
    write said combined value as the object ID to a child RFID tag.

2. An RFID tag system according to claim 1 wherein said reader/writer is configured to read a value of said counter of said parent RFID tag, change the read value, and write the changed value back to said counter of said parent RFID tag.

3. An RFID tag system according to claim 2 wherein said reader/writer is configured to change said counter of said parent RFID tag value subsequent to writing said combined value as the object ID to said child RFID tag.

4. An RFID tag system according to claim 1 wherein said reader/writer is configured to initialize a value of a counter of said child RFID tag.

5. A method for managing RFID tags, including creating one or more child RFID tag object IDs from a parent RFID tag, the method comprising:
    providing a parent RFID tag having an object ID, and a counter for generating a value corresponding to the number sequence of said one or more child RFID tag object IDs to be created;
    reading values of said object ID of said parent RFID tag and said counter of said parent RFID tag;
    combining said values by appending the value of said counter of said parent RFID tag to an end of the value of said object ID of said parent RFID tag into a combined value; and
    writing said combined value as the object ID to a child RFID tag.

6. A method according to claim 5 and further comprising: changing the read value of said counter of said parent RFID tag; and writing the changed value back to said counter of said parent RFID tag.

7. A method according to claim 6 wherein said changing step comprises changing the read counter value of said parent RFID tag subsequent to writing said combined value as the object ID to said child RFID tag.

8. A method according to claim 5 and further comprising initializing a value of a counter of said child RFID tag.

9. A method according to claim 5 and further comprising:
    reading values of said object ID of said child RFID tag and a counter of said child RFID tag;
    combining the values by appending the value of said child RFID tag counter to an end of the value of said child RFID tag object ID; and
    writing said combined child RFID tag object ID and counter value as the object ID to a grandchild RFID tag.

* * * * *